United States Patent Office 3,235,384

Patented Feb. 15, 1966

3,235,384

REPRODUCTION LAYERS FOR PLANOGRAPHIC AND OFFSET PRINTING PLATES

Wilhelm Neugebauer and August Rebenstock, Wiesbaden-Biebrich, Germany, assignors, by mesne assignments, to Azoplate Corporation, Murray Hill, N.J.

No Drawing. Filed Nov. 6, 1961, Ser. No. 150,211
Claims priority, application Germany, Oct. 7, 1960, K 41,839
26 Claims. (Cl. 96—33)

This application is a continuation-in-part of application Serial No. 69,816, filed November 17, 1960, now abandoned.

The present invention relates to novel reproduction layers for use as components of printing plates, the layers comprising as the light sensitive substance at least one condensation product obtained from a diazo compound by condensation with formaldehyde. More particularly, the invention is concerned with printing plate reproduction layers containing or consisting of diazo compounds which have been obtained by the reaction of a p-amino-diphenylamine diazonium salt with formaldehyde in highly concentrated phosphoric acid.

Procedures for the preparation of printing plates for planographic and offset printing are known, in which light sensitive diazo compounds of higher molecular weight are used. The reproduction layers are applied to lithographic supports of various kinds, such as metal foils or plates or to paper and the like. Since the shelf life of the coatings prepared according to this procedure is not very long, various procedures have been recommended to improve it. Thus, substances are added to the coatings which convert the light sensitive diazo compounds into difficulty soluble compounds, or the diazo compounds of higher molecular weight are used together with other diazo compounds, or the diazo compounds are converted into their diazo sulfonates or diazo-amino compounds. It was found that the latter diazo sulfonates and diazo amino compounds are very suitable for the preparation of reproduction layers in such cases where a long shelf life is required. However, reproduction layers containing diazo sulfonates or diazo amino compounds as light sensitive substances, or consisting of these light sensitive substances, have a considerably lower light sensitivity than copying material which has been sensitized by means of the diazonium salts from which the diazo sulfonates or diazo amino compounds have been prepared. Furthermore, the diazosulfonates are inferior to the diazonium salts, insofar as their capacity for accepting greasy ink is concerned.

The present invention relates to repreduction layers for the preparation of printing plates for planographic and offset printing which have an excellent shelf life combined with a high light sensitivity. It has been found that reproduction layers having the foregoing improved properties are obtained if the light sensitive coating on the lithographic support is produced by using condensation products of diazonium salts of p-amino-diphenylamines, such as diphenylamine-4-diazonium chloride or diphenyl-amine-4-diazonium bromide or diphenyl-amine-4-diazonium phosphate, with formaldehyde in phosphoric acid of high concentration. The term "phosphoric acid" also includes pyrophosphoric acid, metaphosphoric acid, and poly-phosphoric acid.

By phosphoric acid of high concentration, the commercial 85% phosphoric acid is meant. This acid, however, is not necessarily required for the production of the condensation products of the present invention. Phosphoric acids of a lower concentration, e.g. 60% to 70% phosphoric acid, or of higher concentration, e.g. polyphosphoric acid, are also suitable. The same applies to the above mentioned pyrophosphoric acid and metaphosphoric acid. The production of the condensation products according to the present invention is effected more rapidly and completely the higher the concentration of the phosphoric acid which is used as the condensation medium.

The proportions of diazonium salt and formaldehyde used in the condensation process may vary widely. A molar ratio of about 1:1 is preferred; however, suitable condensation products are obtained with molar ratios ranging from 0.5 to 2 moles of formaldehyde to each mole of diazonium salt. The ratio of diazonium salt to phosphoric acid may also vary widely. For practical reasons, a higher concentration of the diazonium salt in the phosphoric acid is preferred, e.g. 100 parts by weight of diazonium salt per 200 parts by weight of phosphoric acid. Suitably, the condensation is effected at moderate heat, such as 40° C.; however, lower or higher temperatures may be employed with corresponding variations of the time of reaction. Generally, at a temperature of about 40° C., the reaction is completed after about 24 hours.

The viscous condensation products obtained have a good shelf life and are ready for shipment. In order to prepare the copying material according to the present invention using the condensation products obtained in highly concentrated phosphoric acid, it is not necessary to isolate the latter in solid form from the crude condensation products. The crude condensates may preferably be employed directly for the preparation of the copying material according to the present invention; they need only to be diluted. Thus water or organic solvents, in which the condensation products are in general easily soluble, are added to the crude condensation products before the light sensitive coating is applied to the lithographic support. Mixtures of water and organic solvents may also be used for the dilution of the crude condensation products. When organic solvents are used, the diluted raw condensates may be applied more easily to the lithographic support and the reproduction coatings obtained will generally be more uniform.

The optimum concentration of the coating solution depends on the surface character of the lithographic support and on the procedure used for the application of the coating solution to the support. Generally, a good coating on the support is obtained if the concentration of the coating solution is between 0.04 and 0.8% by weight, calculated on the dry diazo compound present in the crude condensate. Particularly in the case of metal supports, it may be advisable to decrease the acid concentration of the coating solution, e.g. by addition of basic ion exchangers (anion exchangers), the removal of which before application of the solution to the support is recommended.

Antioxidants, small quantities of dyestuffs and/or film forming agents, such as polyacrylic and polyvinyl pyrrolidone, commonly used with light sensitive diazo compounds for reproduction purposes, may be added to the reproduction material according to the present invention.

Printing plates may be prepared from the reproduction material according to the present invention in a conventional manner. The dry reproduction coating is exposed to light behind a master and the exposed coating is then developed, e.g., by rinsing with water to which a small quantity of gum arabic has advantageously been added. After inking with greasy ink, long runs can be obtained from these printing plates.

The invention will be further illustrated by reference to the following specific examples.

*Example 1*

A planographic printing plate on aluminum base is prepared by coating an aluminum foil, which has been previously mechanically roughened by brushing, with a solution comprising 0.125 part by weight of a crude condensate of paraformaldehyde and diphenyl-amine-4-diazonium chloride described in detail below, 8 parts by weight of water, 60 parts by weight of ethyleneglycol-monomethylether and 40 parts by weight of dimethyl-formamide. Coating of the brushed aluminnum foil is effected in known manner, e.g., by using a plate whirler. Then the coated aluminum foil is dried and heated to 100° for 1 to 2 minutes. The light sensitive coating is exposed to light behind a negative master, e.g., for 10 to 30 seconds to the light of an 18 amp. arc lamp at a distance of 70 cm.

The exposed coating is developed with a 7% aqueous solution of gum arabic using a cotton pad, and the same pad is used to apply the greasy ink. Then the plate is ready for printing. If the plate is to be stored for a longer period before printing it is suitable to gum the plate in known manner. Furthermore, the developed plate may be improved by lacquering according to known procedures. Development and lacquering may be effected in one procedure by means of an aqueous emulsion type lacquer. Such emulsion type lacquers are described, e.g., in the United States Patent No. 2,754,279.

When still unexposed to light, the presensitized aluminum foil has a good shelf life. After exposure and development the plate readily accepts greasy ink.

The presensitized printing foil may be prepared with equally good results by using, as the support for the light sensitive coating, an aluminum foil coated with a Böhmite-coating or an electrolytically treated aluminum foil in place of the aluminum foil roughened by brushing.

The above mentioned crude condensate of paraformaldehyde and diphenylamine-4-diazonium chloride is prepared as follows:

3.3 parts by weight of paraformaldehyde and 23 parts by weight of diphenyl-amine-4-diazonium chloride are introduced, with agitation and at room temperature into 42 parts by weight of 85% phosphoric acid. A viscous solution is obtained. The reaction mixture is agitated at room temperature for half an hour and then heated to 40° C. This temperature is maintained for an additional 24 hours. The reaction is then finished. The reaction can also be effected by substituting the phosphoric acid by the same quantity of pyrophosphoric acid or metaphosphoric acid.

The condensation product, which is a homogeneous viscous mixture, has an excellent shelf life and may also be shipped. It may be mixed with water as well as with various organic solvents such as methanol or other aliphatic alcohols, dioxane, ethyleneglycol-mono-methylether, dimethylformamide and the like. Thus by choosing a suitable solvent, the composition of the solutions to be applied may be controlled so that they are suitable for the material to be coated and, furthermore, a combination of the condensation products with additives that are water-soluble as well as those which are insoluble in water but soluble in organic solvents is possible. The viscous reaction product may be used directly for many purposes without isolation of the diazo compounds present therein, which from a technical point of view has proved to be very advantageous.

*Example II*

The procedure of Example I is followed with the exception that for coating a 0.1% aqueous solution of the condensate described in Example I is used to which 0.08% of polyacrylic acid of medium viscosity (intrinsic viscosity: 0.5) is added. The presensitized printing foil thus obtained has an excellent shelf life.

*Example III*

A presensitized printing foil is prepared according to example I. A crude condensate is used which was obtained according to Example I, using the same quantity of diphenylamine-4-diazonium bromide or diphenylamine-4-diazonium phosphate instead of diphenylamine-4-diazonium chloride.

*Example IV*

For the preparation of a paper printing foil, a paper foil, prepared, e.g., according to U.S. Patent 2,778,735, is coated with an aqueous solution containing, per 100 parts by weight of water, 5.5 parts by weight of the crude condensate of paraformaldehyde and diphenylamine-4-diazonium chloride described in detail below. The coated paper foil is dried at moderate temperature. The material has a very good shelf life and a high light sensitivity. The conversion of the presensitized paper foil after exposure behind a master to a foil ready for printing is effected according to the procedure of Example I.

The above mentioned crude condensate is obtained by adding, with agitation, 3.3 parts by weight of paraformaldehyde and 23 parts by weight of diphenylamine-4-diazonium chloride to 108 parts by weight of 85% phosphoric acid at room temperature. The viscous solution is further agitated at room temperature for half an hour and is then heated to 40° C. The mixture is maintained for 24 hours at this temperature. The resulting reaction mixture is viscous and has an excellent shelf life. Instead of 23 parts by weight of diphenylamine-4-diazonium chloride, 30 parts by weight of diphenylamine-4-diazonium sulfate may be used.

For the preparation of the reproduction layer, the above described crude condensate may be substituted with equally good results by a condensation product prepared as follows: 1.65 parts by weight of paraformaldehyde and 14.7 parts by weight of diphenylamine-4-diazonium phosphate are introduced with agitation into 33 parts by weight of polyphosphoric acid (81%). Then the mixture is heated to 40° C. and maintained for 24 hours at this temperature. The resulting reaction mixture is unusually vicous and has a very good shelf life at normal room temperature.

The coating solution to be prepared with this crude condensate has the following composition:

2.5 parts by weight of the crude condensate
100 parts by weight of water
3.7 parts by weight of sulfuric acid

*Example V*

For the production of copying material suitable for the preparation of a planographic printing plate, a mechanically roughened aluminum foil is sensitized with a coating solution prepared as follows: 50 parts by weight of the condensation product of paraformaldehyde and diphenylamine-4-diazonium chloride described in Example I are diluted with 100 parts by weight of water and 50 parts by weight of basic aluminum acetate are introduced into the solution with agitation. The mixture is agitated for another quarter of an hour, the solid material is removed by suction filtration, and the filtrate is is diluted with 20 times its volume of water.

This solution, which contains only water as a solvent, is applied to the roughened aluminum foil by means of a pad; the excess solution is removed by means of a fresh pad. The coated material is dried and has a high light sensitivity.

After drying, the presensitized plate is exposed to light under a negative master. Development and finishing of the plate for printing is effected according to Example I.

Equivalent copying materials are obtained by substituting the above mentioned mechanically roughened aluminum foils by zinc plates. Superficially saponified foils of acetyl cellulose may also be used as a support for the coating.

*Example VI*

A paper printing foil, prepared in accordance with the teaching of U.S. Patent No. 2,778,735, is coated with a solution containing, dissolved in 100 parts by volume of water, 2.7 parts by weight of concentrated sulfuric acid and 2.5 parts by weight of crude condensation product obtained by condensation of 3-methoxy-diphenylamine-4-diazonium chloride with formaldehyde in phosphoric acid.

When dried at moderate temperature, the foil forms a reproduction material of very good shelf life. It is exposed under a master and the exposed side is rinsed with water. A printing plate is obtained which readily accepts greasy ink and yields a large number of flawless prints.

For the preparation of the crude condensate mentioned above, first 1.3 parts by weight of paraformaldehyde and then 10.4 parts by weight of 3-methoxy-diphenylamine-4-diazonium chloride are introduced into 10 parts by volume of 85 percent phosphoric acid, and the reaction mixture is then heated for 35 hours to a temperature of 40° C., with agitation. The viscous raw condensate can be easily stored and shipped.

*Example VII*

A presensitized aluminum foil suitable for planographic printing, which has excellent shelf life, is prepared following the procedure described in Example I, using, instead of the compound stated in Example I, a 0.1 percent solution of the raw condensate described below in a mixture consisting of 55 parts by volume of ethylene glycol monomethyl ether, 37 parts by volume of dimethyl formamide, and 8 parts by volume of water.

The raw condensate is prepared as follows: 1.58 parts by weight of paraformaldehyde are suspended in 15.6 parts by weight of 85 percent phosphoric acid, and then 15.5 parts by weight of 2-methoxy-diphenylamine-4-diazonium phosphate are added to the mixture. After stirring for 40 hours at a temperature of 40° C., the condensation is complete.

The viscous raw condensate thus obtained can be easily store and shipped.

*Example VIII*

The procedure described in Example VII is followed, but for sensitizing the support a solution is used of 0.1 part by weight of the condensate stated below dissolved in a mixture made up of 55 parts by volume of ethyleneglycol monomethyl ether, 37 parts by volume of dimethyl formamide, and 8 parts by volume of water.

For the preparation of the condensate, 0.75 part by weight of paraformaldehyde and 7.0 parts by weight of 3-methyl-diphenylamine-4-diazonium phosphate are introduced into 6.6 parts by weight of 95 percent phosphoric acid. After heating the mixture for 24 hours to a temperature of 40° C., with simultaneous agitation, the condensation is complete and the product is ready for use.

*Example IX*

For the preparation of a planographic printing foil, a paper support laminated with an aluminum layer is coated on the aluminum side with a solution containing 0.1 part by weight of the condensate described below dissolved in a mixture made up of 55 parts by volume of ethyleneglycol monomethyl ether, 37 parts by volume of dimethyl formamide, and 8 parts by volume of water. After 2 minutes' drying at 100° C. and exposure under a master, the foil is clamped onto a printing machine and briefly wiped over with a cotton pad soaked in water. A large number of flawless prints are obtained.

The raw condensate is prepared by introducing, first, 3.3 parts by weight of paraformaldehyde and then 26.1 parts by weight of 4-methoxy-diphenylamine-4'-diazonium chloride into 31.1 parts by weight of 85 percent phosphoric acid. After agitating the mixture for 40 hours at a temperature of 40° C., the reaction is complete and the condensate obtained is ready for use.

*Example X*

The procedure described in Example IX is followed, but the material is sensitized with the following raw condensate: 5 parts by weight of 3-ethoxy-diphenylamine-4-diazonium chloride are introduced into a suspension of 0.56 part by weight of paraformaldehyde in 5.8 parts by weight of a 97 percent phosphoric acid. After reaction for 70 hours at 40° C., the condensate is ready for use.

*Example XI*

For the preparation of a presensitized paper printing foil of good performance and storage capability, a paper support, such as the one described in U.S. Patent No. 2,778,735, is coated by swabbing with a solution containing 2 parts by weight of the raw condensate described below and 3.6 parts by weight of 98 percent sulfuric acid in 100 parts by volume of water.

For the preparation of the raw condensate, a mixture of 4.7 parts by weight of 3-methyl-diphenylamine-4'-diazonium chloride and 0.63 part by weight of paraformaldehyde is condensed for 24 hours at 40° C. in 5.5 parts by weight of 95 percent phosphoric acid.

*Example XII*

The procedure described in Example XI is followed, but for sensitizing the paper support a raw condensate is used which was prepared as follows:

First, 1.39 parts by weight of paraformaldehyde and then 14 parts by weight of 2-methoxy-diphenylamine-4'-diazonium phosphate are introduced into 14 parts by weight of 85 percent phosphoric acid, and the mixture is condensed for 26 hours at a temperature of 40° C.

It will be obvious to those skilled in the art that many modifications may be made within the scope of the present invention without departing from the spirit thereof, and the invention includes all such modifications.

What is claimed is:

1. A presensitized printing plate comprising a base material having a coating thereon, the coating comprising a diazo compound prepared by the reaction of formaldehyde with a diazonium salt of a p-aminodiphenylamine in high concentration phosphoric acid.

2. A presensitized printing plate comprising a base material having a coating thereon, the coating comprising a diazo compound prepared by the reaction of formaldehyde with a diazonium salt of a p-aminodiphenylamine in high concentration phosphoric acid, and a film forming substance.

3. A presensitized printing plate according to claim 1 in which the diazo compound is a condensate prepared by the reaction of formaldehyde with diphenylamine-4-diazonium chloride in high concentration phosphoric acid.

4. A presensitized printing plate according to claim 1 in which the diazo compound is a condensate prepared by the reaction of formaldehyde with diphenylamine-4-diazonium bromide in high concentration phosphoric acid.

5. A presensitized printing plate according to claim 2 in which the film forming substance is polyacrylic acid.

6. A process for making a printing plate which comprises exposing a coated base material to light under a master, the coating comprising a diazo compound prepared by the reaction of formaldehyde with a diazonium salt of a p-aminodiphenylamine in high concentration phosphoric acid, and treating the exposed coating with a developing solution.

7. A process for making a printing plate which comprises exposing a coated base material to light under a master, the coating comprising a diazo compound prepared by the reaction of formaldehyde with a diazonium salt of a p-aminodiphenylamine in high concentration phosphoric acid, and a film forming substance, and treating the exposed coating with a developing solution.

8. A process for making a printing plate which comprises exposing a coated base material to light under a master, the coating comprising a diazo compound prepared by the reaction of formaldehyde with a diazonium salt of a p-aminodiphenylamine in high concentration phosphoric acid, and polyacrylic acid, and treating the exposed coating with a developing solution.

9. As a new product, a solution of a condensation product of diphenylamine-4 diazonium salt and formaldehyde in phosphoric acid.

10. A compound produced by condensing formaldehyde with a diphenylamine-4-diazonium salt in phosphoric acid of high concentration.

11. A presensitized printing plate according to claim 1 in which the diazonium salt of a p-aminodiphenylamine is diphenylamine-4-diazonium phosphate.

12. A presensitized printing plate according to claim 1 in which the diazonium salt of a p-aminodiphenylamine is diphenylamine-4-diazonium sulfate.

13. A presensitized printing plate according to claim 1 in which the diazonium salt of a p-aminodiphenylamine is 3-methoxy-diphenylamine-4-diazonium chloride.

14. A presensitized printing plate according to claim 1 in which the diazonium salt of a p-aminodiphenylamine is 2-methoxy-diphenylamine-4-diazonium phosphate.

15. A presensitized printing plate according to claim 1 in which the diazonium salt of a p-aminodiphenylamine is 3-methyl-diphenylamine-4-diazonium phosphate.

16. A presensitized printing plate according to claim 1 in which the diazonium salt of a p-aminodiphenylamine is 4-methoxy-diphenylamine-4'-diazonium chloride.

17. A presensitized printing plate according to claim 1 in which the diazonium salt of a p-aminodiphenylamine is 3-ethoxy-diphenylamine-4-diazonium chloride.

18. A presensitized printing plate according to claim 1 in which the diazonium salt of a p-aminodiphenylamine is 3-methyl-diphenylamine-4'-diazonium chloride.

19. A process according to claim 6 in which the diazonium salt of a p-aminodiphenyl amine is diphenylamine-4-diazonium phosphate.

20. A process according to claim 6 in which the diazonium salt of a p-aminodiphenyl amine is diphenylamine-4-diazonium sulfate.

21. A process according to claim 6 in which the diazonium salt of a p-aminodiphenyl amine is 3-methoxy-diphenylamine-4-diazonium chloride.

22. A process according to claim 6 in which the diazonium salt of a p-aminodiphenyl amine is 2-methoxy-diphenylamine-4-diazonium phosphate.

23. A process according to claim 6 in which the diazonium salt of a p-aminodiphenylamine is 3-methyl-diphenylamine-4-diazonium phosphate.

24. A process according to claim 6 in which the diazonium salt of a p-aminodiphenylamine is 4-methoxy-diphenylamine-4'-diazonium chloride.

25. A process according to claim 6 in which the diazonium salt of a p-aminodiphenylamine is 3-ethoxy-diphenylamine-4-diazonium chloride.

26. A process according to claim 6 in which the diazonium salt of a p-aminodiphenylamine is 3-methyl-diphenylamine-4'-diazonium chloride.

References Cited by the Examiner

UNITED STATES PATENTS

| | | | |
|---|---|---|---|
| 2,063,631 | 12/1936 | Schmidt et al. | 96—91 |
| 2,272,498 | 2/1942 | Zerweck et al. | 260—141 |
| 2,679,498 | 5/1954 | Seven et al. | 96—33 X |
| 2,739,889 | 3/1956 | Neugebauer et al. | 96—33 |
| 2,937,085 | 5/1960 | Seven et al. | 96—75 X |
| 3,061,429 | 10/1962 | Neugebauer et al. | 96—33 |

FOREIGN PATENTS

| | | |
|---|---|---|
| 640,491 | 7/1950 | Great Britain. |
| 698,040 | 10/1953 | Great Britain. |

OTHER REFERENCES

Ellis: The Chemistry of Synthetic Resins, Reinhold Publ. Corp., vol. 1, 1935, p. 707.

Mellor: A Comprehensive Treatise on Inorganic and Theoretical Chemistry, Longmans, Green and Co. London, New York and Toronto, 1947, vol. VIII, pages 924, 951–953, 973, 979, 980, 984 and 992–993.

NORMAN G. TORCHIN, *Primary Examiner.*

HAROLD N. BURSTEIN, *Examiner.*